(12) United States Patent
Charles et al.

(10) Patent No.: US 11,889,953 B2
(45) Date of Patent: Feb. 6, 2024

(54) CUTTING BOARD WITH NESTED CONTAINERS

(71) Applicant: TidyBoard LLC, San Francisco, CA (US)

(72) Inventors: Matthew Charles, San Francisco, CA (US); Mark Van Velzen, Lafayette, CA (US); William Charles, Reno, NV (US)

(73) Assignee: TidyBoard LLC, San Francisco, CA (US)

( * ) Notice: Subject to any disclaimer, the term of this patent is extended or adjusted under 35 U.S.C. 154(b) by 159 days.

(21) Appl. No.: 17/508,677

(22) Filed: Oct. 22, 2021

(65) Prior Publication Data

US 2022/0039605 A1 Feb. 10, 2022

Related U.S. Application Data

(63) Continuation-in-part of application No. 16/885,664, filed on May 28, 2020, now Pat. No. 11,571,091.

(60) Provisional application No. 62/853,394, filed on May 28, 2019.

(51) Int. Cl.
*A47J 47/00* (2006.01)
*A47J 47/14* (2006.01)

(52) U.S. Cl.
CPC ............. *A47J 47/005* (2013.01); *A47J 47/14* (2013.01)

(58) Field of Classification Search
CPC ................................ A47J 47/005; A47J 47/14
See application file for complete search history.

(56) References Cited

U.S. PATENT DOCUMENTS

| 4,435,434 | A  |   | 3/1984  | Caporaso |
|-----------|----|---|---------|----------|
| 6,460,841 | B1 |   | 10/2002 | Durr     |
| 7,213,806 | B2 | * | 5/2007  | Mitchell ............... A47J 47/005 269/302.1 |
| 7,252,255 | B2 |   | 8/2007  | Cornfield |
| D605,908  | S  | * | 12/2009 | Pearl .............................. D7/698 |
| D6,059,087 |   |   | 12/2009 | Pearl et al. |
| 8,251,357 | B2 |   | 8/2012  | Young    |
| 9,049,963 | B2 |   | 6/2015  | Young    |
| 9,066,626 | B2 | * | 6/2015  | Young .................... A47J 47/005 |
| D902,676  | S  | * | 11/2020 | Mei ................................ D7/698 |
| 11,019,964| B1 | * | 6/2021  | Prepon .................. A47J 47/005 |
| 2005/0039607 | A1 |   | 2/2005 | Comfield  |
| 2008/0149552 | A1 | * | 6/2008 | Murphy ................ A47J 47/005 210/251 |

(Continued)

OTHER PUBLICATIONS

Charleston Wrap, Kitchen & Home Catalog, Mar. 2015 in printed form and on-line.

*Primary Examiner* — Lee D Wilson
(74) *Attorney, Agent, or Firm* — Park, Vaughan, Fleming & Dowler LLP

(57) ABSTRACT

A cutting board with one or more cut-out sections is provided. The cutting board includes at least one work surface and a frame that transitions from a first (e.g., closed, stowed) position to a second position in which the frame at least partially defines a cut-out for removably holding one or more containers. The work surface may be used to prepare food ingredients, which are easily transported to the one or more containers. When work is complete, the containers are removed and the frame is returned to the first position, in which the cutting board occupies less space than in the second position.

16 Claims, 14 Drawing Sheets

(56) References Cited

U.S. PATENT DOCUMENTS

| | | | |
|---|---|---|---|
| 2009/0146353 A1* | 6/2009 | Hashim | A47J 47/005 269/302.1 |
| 2009/0322004 A1 | 12/2009 | Young | |
| 2015/0216365 A1 | 8/2015 | Lee et al. | |
| 2020/0375408 A1* | 12/2020 | Charles | A47J 47/005 |
| 2022/0039605 A1* | 2/2022 | Charles | A47J 47/14 |

* cited by examiner

CUTTING BOARD WITH NESTED CONTAINERS

RELATED ART

This application is a continuation-in-part of U.S. patent application Ser. No. 16/885,664, which was filed May 28, 2020. This application also claims priority under 35 U.S.C. § 119 to U.S. Provisional Application No. 62/853,394, filed 28 May 2019. These applications are incorporated herein by reference in their entirety.

BACKGROUND

This disclosure relates to the field of consumer goods. More particularly, a cutting board is provided that features at least one cut-out for accommodating one or more containers.

Existing cutting boards often provide mediocre user experiences during food preparation due to their limited surface area, which can quickly become cluttered with prepared ingredients, scraps, containers, etc. For example, some ingredients or scraps may need to be thrown away or composted, others may need to be washed or strained, others may need to be stored, while others may be intended for immediate use. Existing cutting boards generally do not assist a user in separating, sorting, or transporting the items for their intended dispositions. Instead, a user may need to awkwardly transfer items between the board and various containers placed around the area in which the cutting board is being used.

SUMMARY

In some embodiments, a cutting board described herein features one or more cut-out sections, bores, or voids. The cutting board may be situated such that while some or most of the board is supported by a counter, table, or other underlying support, a cut-out may be located past an edge of the support. One or more removable and nestable/stackable containers fit into a cut-out such that their outer edges substantially align with a border of the cut-out; for example, they may be configured to closely fit the border of the cut-out, which may feature a lip or ledge for engaging and supporting edges of the containers. While the cutting board is in use, items may be easily transferred from a cutting surface by brushing or scraping them into the one or more containers. Lids may be provided for some or all containers.

In some embodiments, a cutting board features a single cut-out into which multiple containers are nested or stacked, and different containers may be used for different purposes. For example, one may receive items that are to be stored, another may receive items to be composted, another acts as a strainer, and so on. The single cut-out may be a permanent feature of the cutting board. One result of this configuration is the ability of a user to carry, store, or otherwise manipulate the cutting board by grasping a border of the cut-out with his or her hand. Other embodiments may feature multiple cut-outs.

When installed in one or more cut-outs, top edges of the installed containers may be substantially coplanar with the surface of the cutting board without extending above the plane of the cutting board surface. Because none of the containers extend above the cutting surface, there is little or no impediment to the movement of items from the working area to the containers. In particular, the items need not be lifted from the cutting board in order to be placed in a container.

In some embodiments, a cut-out may be partially defined by a movable or transitionable bar, frame, handle, hinge or other component of a cutting board that transitions from a first position in which the component is closed, folded, or otherwise stowed, such that the cut-out does not exist or is no longer available, to and from a second position in which the component defines at least part of the cut-out. In these embodiments, the cutting board presents a smaller footprint when the component is in the first position than when it is in the second position. The cutting board may be used for food preparation regardless of the position of the component. In some implementations the component rotates between the first and second positions; in some other implementations the components slides between positions.

DETAILED DESCRIPTION

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

In some embodiments, a cutting board is provided that includes at least one cut-out or void for holding nestable or stackable containers or for some other purpose. A cut-out may be fully or partially encircled by the cutting board. In these embodiments, the cutting board is placed on a counter or other support such that the cut-out is located beyond an edge of the support (e.g., over a sink, over open air). Some or all of the cutting board may be weighted so that it remains balanced or level even while food items and/or remnants are placed in the containers.

In some implementations, top edges of a container or of multiple containers installed in a cut-out are substantially flush with the top surface of a working or cutting area of the cutting board, while bottom ends of the containers extend below the bottom surface of the board. In these implementations, items on the work surface can be easily and cleanly wiped, scraped, or otherwise transferred to the container(s) with virtually no mess or spill and without lifting them from the cutting board.

Figure 1:
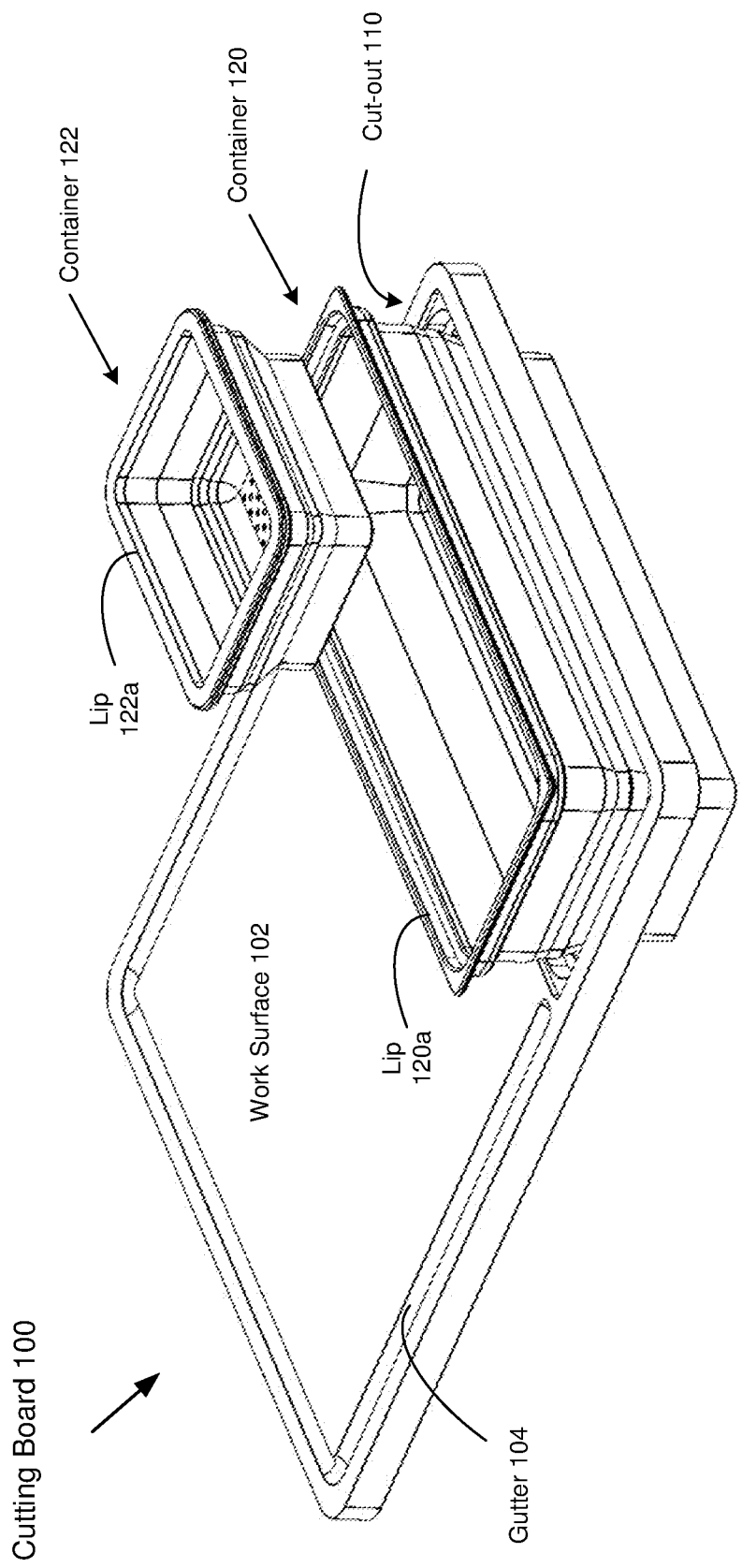
FIG. 1 is a block diagram depicting a cutting board featuring multiple nestable containers within a cut-out, in accordance with some embodiments.

FIG. 1 is a block diagram depicting a cutting board featuring multiple nestable containers within a cut-out, according to some embodiments. In these embodiments, cutting board 100 features work surface 102, gutter 104, and cut-out 110. Cutting board 100, work surface 102, and cut-out 110 may be of various suitable dimensions and composition for cutting, chopping, grating and/or otherwise manipulating or preparing food and/or other items.

In some implementations, for example, work surface 102 may be approximately 14" by 15" while cut-out 110 is approximately 5" by 15". In other implementations, work surface 102 may be weighted to reduce the ratio of work surface area to cut-out area. For example, a weighted version of work surface 110 may be approximately 12" by 12" while cut-out 110 is approximately 6" by 12". These examples are merely illustrative and do not limit the dimensions of cutting board 100 or any component(s) of cutting board 100.

Gutter 104 may define one or more edges of work surface 102, or run parallel and close to one or more edges of work surface 102 but, in at least some embodiments, does not extend between work surface 102 and cut-out 110. Although cutting board 100 is rectangular in FIG. 1, with rounded corners, in other embodiments a cutting board may be square, elliptical or have some other regular or irregular shape.

Cut-out 110 of cutting board 100 accommodates multiple removable containers, including containers 120, 122, some or all of which may be stackable or nestable. Upon installation, edges of the containers are supported on some or all sides by a ledge or edge defining the cut-out. In FIG. 1, container 120 may be considered a 'primary' container in that it is placed first within cut-out 110, while container 122 may be considered a 'secondary' container because it stacks or nests within container 120.

A primary container may accept any number of secondary containers. Therefore, if container 122 is no longer than half the length of container 120, two or more of container 122 may be nested within container 120, side-by-side. Further, one or more of container 122 may be installed as primary containers, that is, they may be installed in cut-out 110 without container 120. Yet further, one or more containers smaller than container 122 may be stacked within container 122.

A container (e.g., container 120, container 122) may feature solid walls and a solid bottom, or one or more walls and/or a bottom may be open or perforated (e.g., to allow liquid to escape). For example, if container 120 has a perforated bottom (and/or if parts of one or more walls of the container are perforated), liquid may flow or seep from the container, possibly into a sink or basin placed below cut-out 110. Also, or alternatively, if the bottom or one or more walls of container 122 are perforated, liquid may flow or seep from container 122 into container 120, thereby allowing container 122 to act as a strainer. Yet further, a separate strainer implement may be installed on a container (e.g., as a top), and the resulting assembly (i.e., the strainer and one or more containers) may remain flush or nearly flush with work surface 102.

In some embodiments, during use of cutting board 100 container 120 is situated in cut-out 100 without any other containers when scraps or remnants on work surface 102 are to be removed from the surface. Container 120 may be emptied as necessary to dispose of the scraps. One or more of container 122 may then be nested in container 120 in order to receive food items or ingredients that are not to be disposed of. For example, as multiple different items (e.g., onion, carrot, tomato) are manipulated (e.g., diced, chopped) on work surface 102, the prepared ingredients may be wiped or scraped into one or more containers 122. As one alternative, cutting board 100 may be used with a single container (e.g., container 120), which may alternatingly be used to capture scraps to be disposed of and food to be saved.

In some embodiments, cutting board 100 (e.g., work surface 102) is made from bamboo, wood, and/or a synthetic polymer that can withstand slicing, chopping and/or other actions with sharp instruments. Containers (e.g., containers 120, 122) may be made of silicon, glass, metal, and/or a natural or synthetic polymer.

Figure 2A:
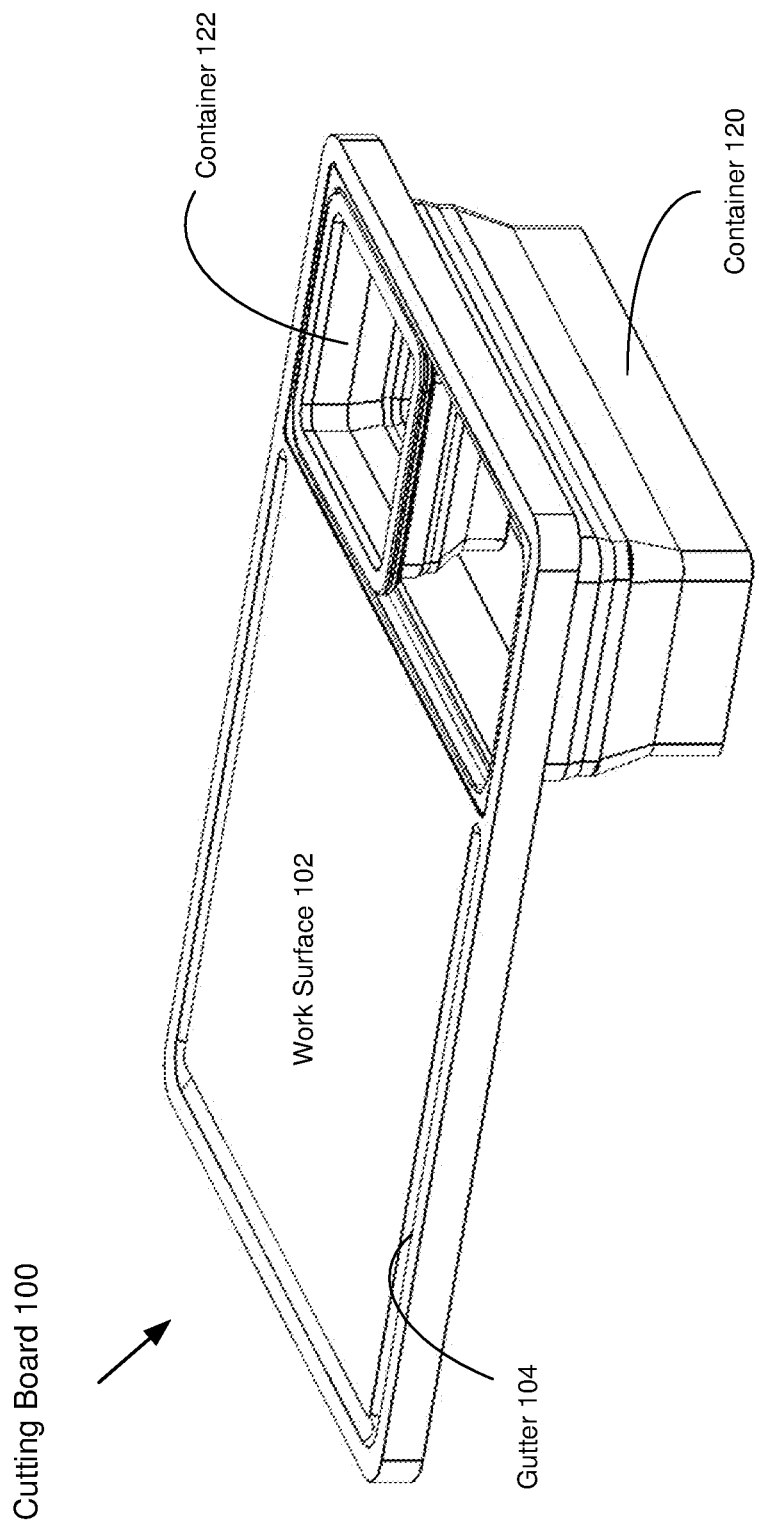
FIG. 2A is a block diagram of the cutting board of FIG. 1 with multiple nestable containers installed in a cut-out, in accordance with some embodiments.
Figure 2B:
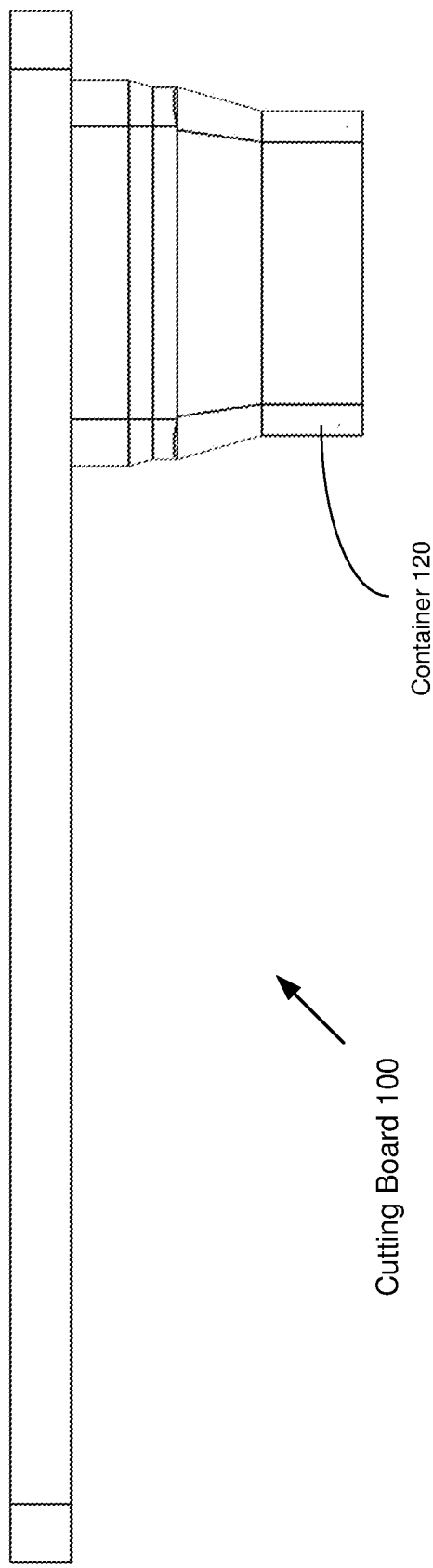
FIG. 2B is a block diagram further depicting the cutting board of FIG. 1 with multiple nestable containers installed in a cut-out, in accordance with some embodiments.

FIGS. 2A-B are block diagrams depicting cutting board 100 of FIG. 1 with nested containers installed in a cut-out, according to some embodiments. In FIG. 2A, a perspective view of cutting board 100 shows that the cut-out is populated with containers 120, 122. A lip or edge of the cut-out supports lip 120a of container 120 (shown in FIG. 1) along its some or all of its circumference and, likewise, lip 120a of container 120 supports lip 122a of container 122 (shown in FIG. 1).

Illustratively, container 122 may be a strainer-type container, in which case a bottom of the container is perforated or pierced in some manner so that liquid moved into container 122 (e.g., liquid that accompanies food ingredients or scraps) passes through container 122 and into container 120. If container 120 is also of the strainer type, the liquid would also pass through container 120. In some implementations, multiple (e.g., two) of container 122 may be installed in container 120, with one of them being of the strainer type and another being of a collector type that features a closed bottom and walls so that whatever is placed in the container (e.g., liquid, solid) remains in the container.

FIG. 2B is a side view of cutting board 100, showing container 120 hanging from the cutting board and supported by cut-out 110. In particular, an edge or rim of container 120 engages a ledge or lip of cut-out 110 (not visible in FIG. 2B), which prevents the container from falling or passing through the cut-out. As shown in FIG. 2B, container 120 does not extend above the work surface of cutting board 100, and neither do any containers nested within container 120 (e.g., container 122).

Figure 3:
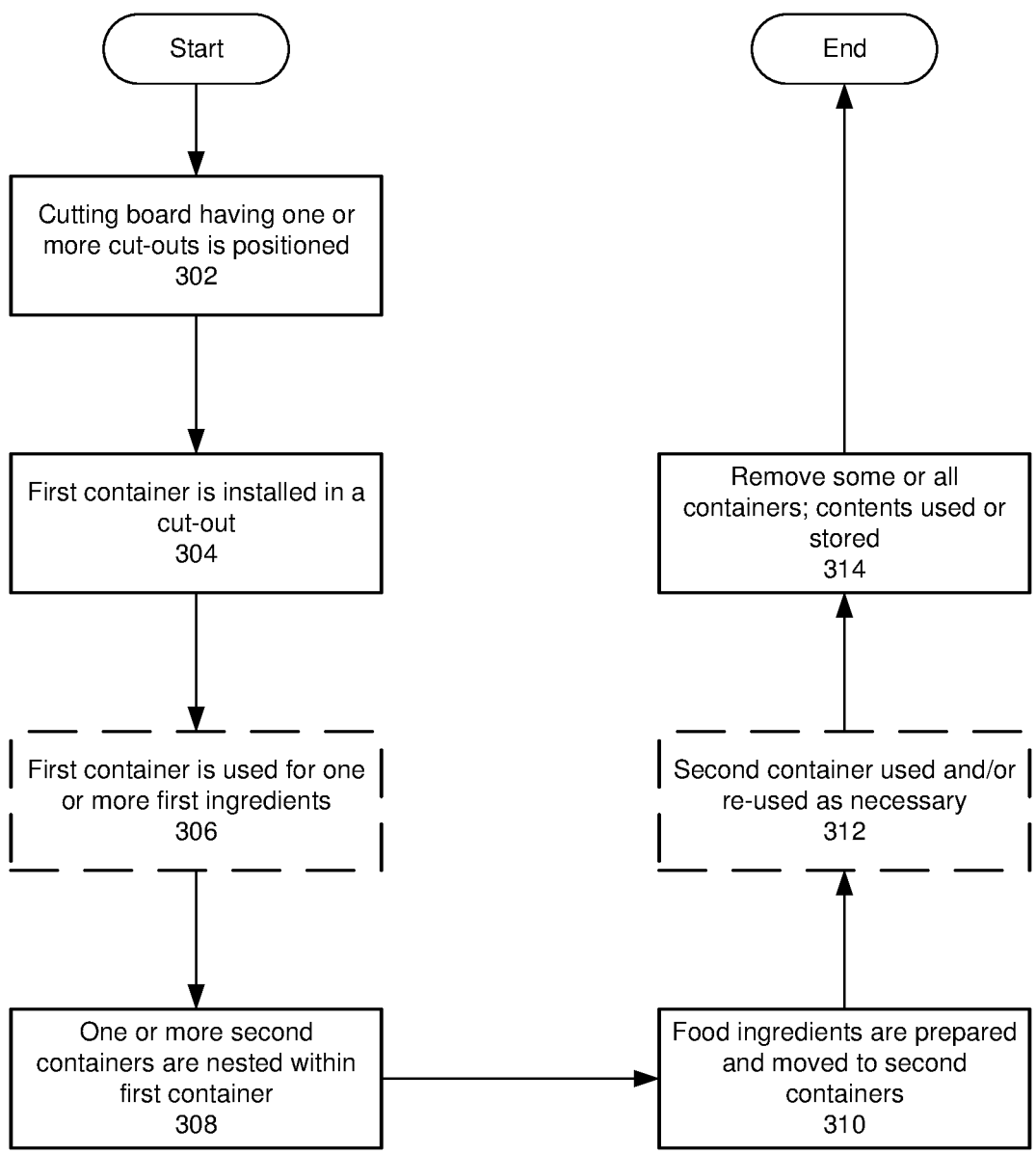
FIG. 3 is a flow chart demonstrating a method of using a cutting board having one or more nestable containers installed in a cut-out section, in accordance with some embodiments.

FIG. 3 is a flow chart demonstrating a method of using a cutting board in which nestable containers can be installed, according to some embodiments. In one or more embodiments, one or more of the steps may be omitted, repeated, and/or performed in a different order. Accordingly, the specific arrangement of steps shown in FIG. 3 should not be construed as limiting the scope of the embodiments.

In operation 302, a cutting board having one or more cut-out sections is placed on a counter or other support. Each cut-out is defined by a ledge, edge, or rim that extends around some or all of the cut-out. In some implementations, the cut-out(s) extend beyond the counter and over a sink or open air. Therefore, while a work surface of the cutting board has immediate underlying support, the cut-out(s) have no immediate underlying support.

In operation 304, a first container is installed in a cut-out section, such that an outer edge or rim of the container catches on and is supported by the cut-out, thereby preventing the first container from falling through the cut-out. The first container does not extend above the plane of the working surface of the cutting board.

The first container may be a strainer type of container (with a bottom that is perforated or otherwise pierced) or a collector type (with a solid bottom), depending on a type of food ingredient to be prepared. For example, if tomatoes are to be diced and the liquid is not needed a strainer-type container may be installed or, if an ingredient having less liquid is to be prepared (e.g., carrot, apple, potato) a collector type of container may be installed.

In optional operation 306, one or more first ingredients are prepared and the ingredients and/or scraps are scraped or wiped into the first container. The first container may then be emptied (e.g., into a cooking pan or pot, into a trash can if it only contains scraps or remnants).

In operation 308, one or more second containers are nested within the first container, such that an outer edge or rim of each second container catches on and is supported by an inner edge or rim of the first container. None of the first and second containers extend above the plane of the working surface of the cutting board.

In operation 310, additional food ingredients are prepared (e.g., cut, sliced, chopped, minced) and moved into the second containers and/or (e.g., by removing a second container) the first container. If any of the additional food ingredients require straining, one or more of the second containers may be strainer-type containers, in which case the strained liquid will pass through to the first container and, if the first container is also a strainer-type container, will also pass through the first container (e.g., and into a sink).

In optional operation 312, one or more second containers may be swapped for other, empty, second containers or may be emptied (e.g., into a cooking vessel, into the trash) and re-installed for additional use with other ingredients.

In operation 314, some or all of the first and second containers are removed from the cutting board cut-out(s). Contents of the containers may be used or placed appropriately; for example, one or more containers may be sealed with a lid to store or conserve their contents.

In some implementations, lids may be placed on the upper-most containers before, during, and/or after the containers are used. Although no container normally extends higher than the work surface of the cutting board, when a lid is placed on a container some or all of the lid may extend above the plane of the work surface.

Figure 4A:
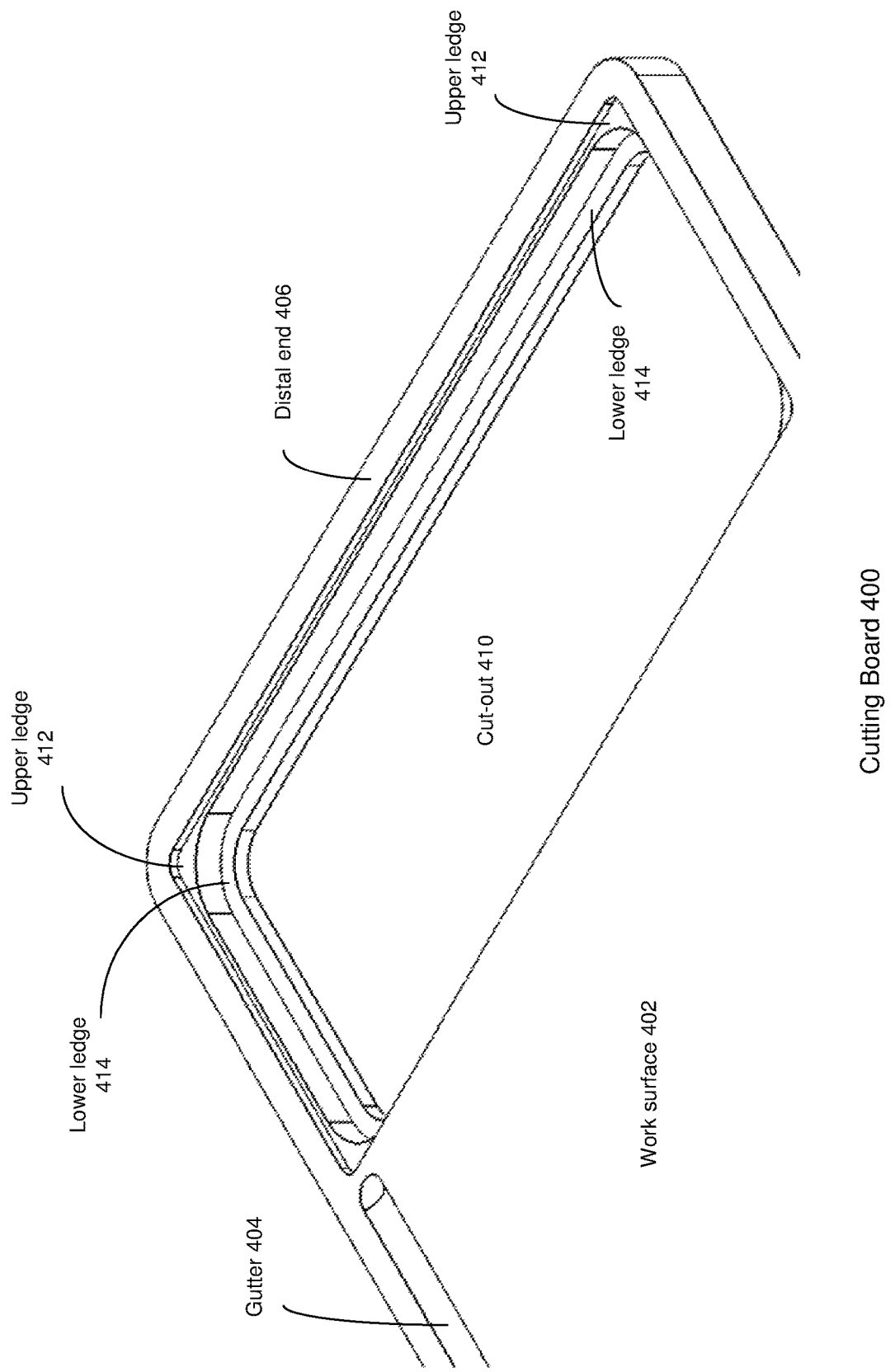
FIG. 4A is a block diagram depicting a cutting board having a cut-out section for installation of nestable containers, in accordance with some embodiments.

FIG. 4A is a block diagram depicting a cutting board having a cut-out section for installation of nestable containers, according to some embodiments.

In these embodiments, cutting board 400 includes work surface 402, gutter 404 and cut-out 410, similar to cutting board 100 of FIG. 1. FIG. 4 also illustrates distal end 406 of cutting board 400, which borders cut-out 410. Note that distal end 406 may be used as a handle for the cutting board.

Cut-out 410 is defined by walls or edges that include upper ledge 412 and lower ledge 414. In some implementations, ledges 412, 414 completely surround the cut-out, while in other implementations they do not completely surround the cut-out. Operation of ledges 412, 414 is shown in more detail in FIG. 4B.

Figure 4B:
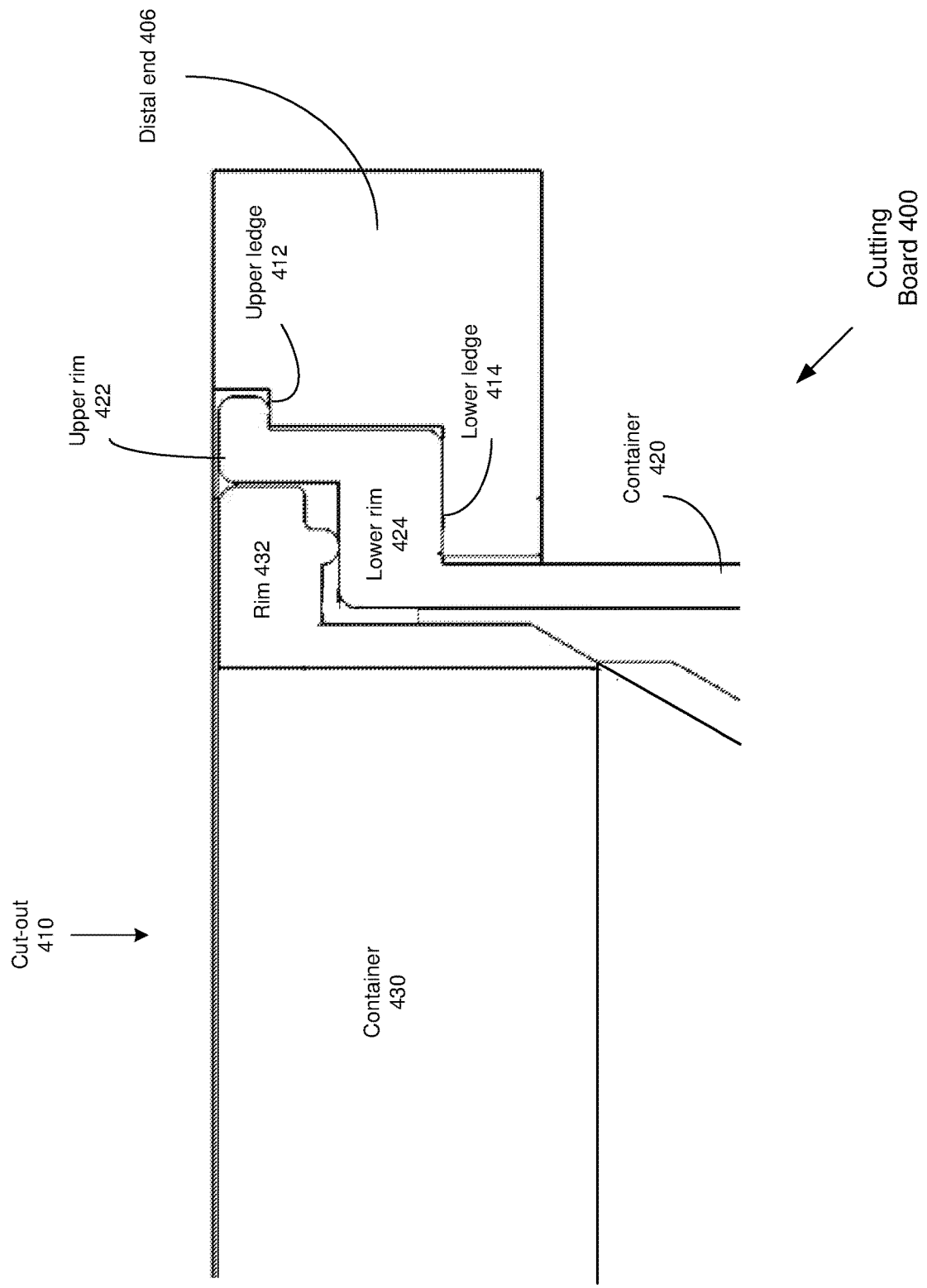
FIG. 4B is a block diagram depicting the cutting board of FIG. 4A with multiple removable and nestable containers installed therein, in accordance with some embodiments.

FIG. 4B is a block diagram depicting the cutting board of FIG. 4A with multiple removable and nestable containers installed therein, according to some embodiments. In FIG. 4B, two containers (containers 420, 430) are nested within cut-out 410. Note that neither of the containers extends above the surface of distal end 406, which is coplanar with work surface 402.

Container 420 includes upper (or external) rim or edge 422, which engages or mates with upper ledge 412, and lower (or internal) rim or edge 424, which engages or mates with lower ledge 414. Similarly, container 430 includes rim or edge 432, which engages with lower rim 424 of container 420.

In some alternative embodiments in which more than two containers are nested without a cut-out, container 430 may include upper and lower rims or edges to engage with container 420 and another container nested within container 430.

In some additional embodiments, a cut-out may be created or removed as needed or desired by movement or transition of a bar, frame, strap, handle, or other component. In particular, in a first position the component is in a closed or stowed position, while in a second position it is in an open position in which it defines at least part of the cut-out. The component may be constructed from one or more suitably rigid materials, including but not limited to plastic, metal, wood, laminate, bamboo, etc.

Figure 5A:
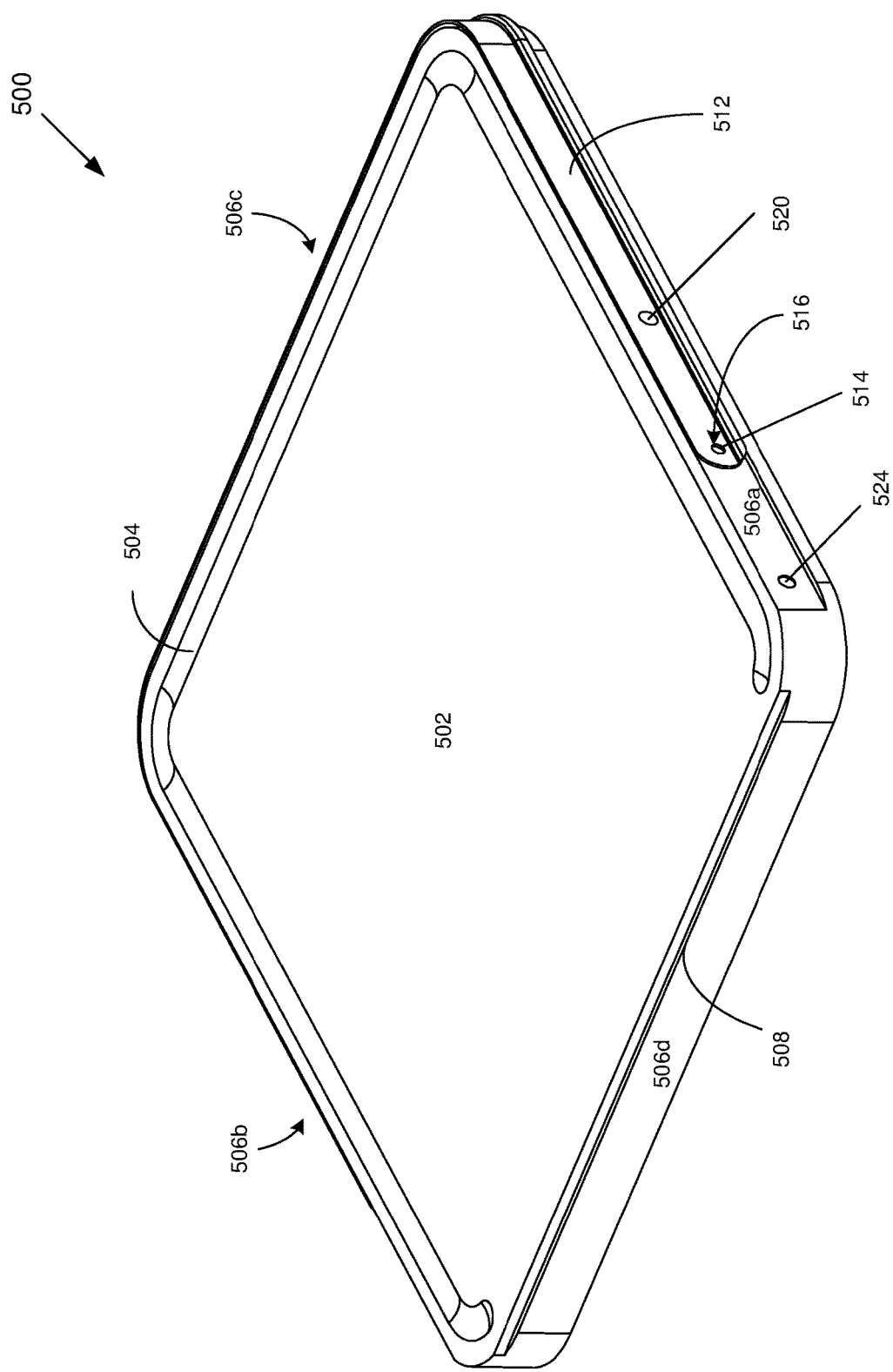
FIG. 5A is a perspective view of a cutting board featuring a rotatable component for on-demand creation and removal of a cut-out, with the component in a first position, in accordance with some embodiments.

FIG. 5A is a perspective view of a cutting board featuring on-demand creation and removal of a cut-out, with a rotatable component in a first position, according to some embodiments.

In these embodiments, cutting board 500 features work surface 502 and gutter or channel 504 as in some other embodiments, as well as opposing sides 506a, 506b and opposing sides 506c, 506d (sides 506b, 506c are not visible in the view of FIG. 5A). Cutting board 500 also features bar 512 in a first position in which it abuts or lies parallel to sides 506a, 506b, 506c of the cutting board. Specifically, opposing longitudinal arms of bar 512 lay parallel to sides 506a, 506b of cutting board 500, and a transverse portion of the bar lies parallel to side 506c. The position of bar 512 in FIG. 5A may be described as closed, stowed, at rest, etc.

Bar 512 is attached (removably or permanently) to the cutting board at pivot points 514 of sides 506a, 506b of the cutting board (only one pivot point 514 is visible in FIG.

5A). In the illustrated embodiments, pivot points 514 comprise extensions, knobs, or other protrusions from sides 506a, 506b of the cutting board that engage with matching orifices 516 of bar 512. Pivot points 514 of cutting board 500 and matching orifices 516 of bar 512 allow bar 512 to transition or pivot from the first position shown in FIG. 5A to a second position (illustrated in FIG. 5B) in which it at least partially defines a cut-out.

Orifices 516 and pivot points 514 may be separable, in which case bar 512 can be detached from cutting board 500 for cleaning and/or other purposes. Alternatively, they may be permanently or semi-permanently connected.

In the closed or retracted position shown in FIG. 5A, tabs 520 of the longitudinal arms of bar 512 (only one of which is visible in FIG. 5A) engage matching recesses, dimples or holes in opposite side edges 506a, 506b of cutting board 500 to provide stability to the bar in both the closed and open positions. Specifically, tabs 520 mate with a first set of recesses 522 when bar 512 is in the first position, and mate with a second set of recesses 524 when the bar is in the open or extended position. Recesses 522 are not visible in FIG. 5B because they are occupied and obscured by tabs 520; one of recesses 524 is visible in FIG. 5A.

Figure 5B:
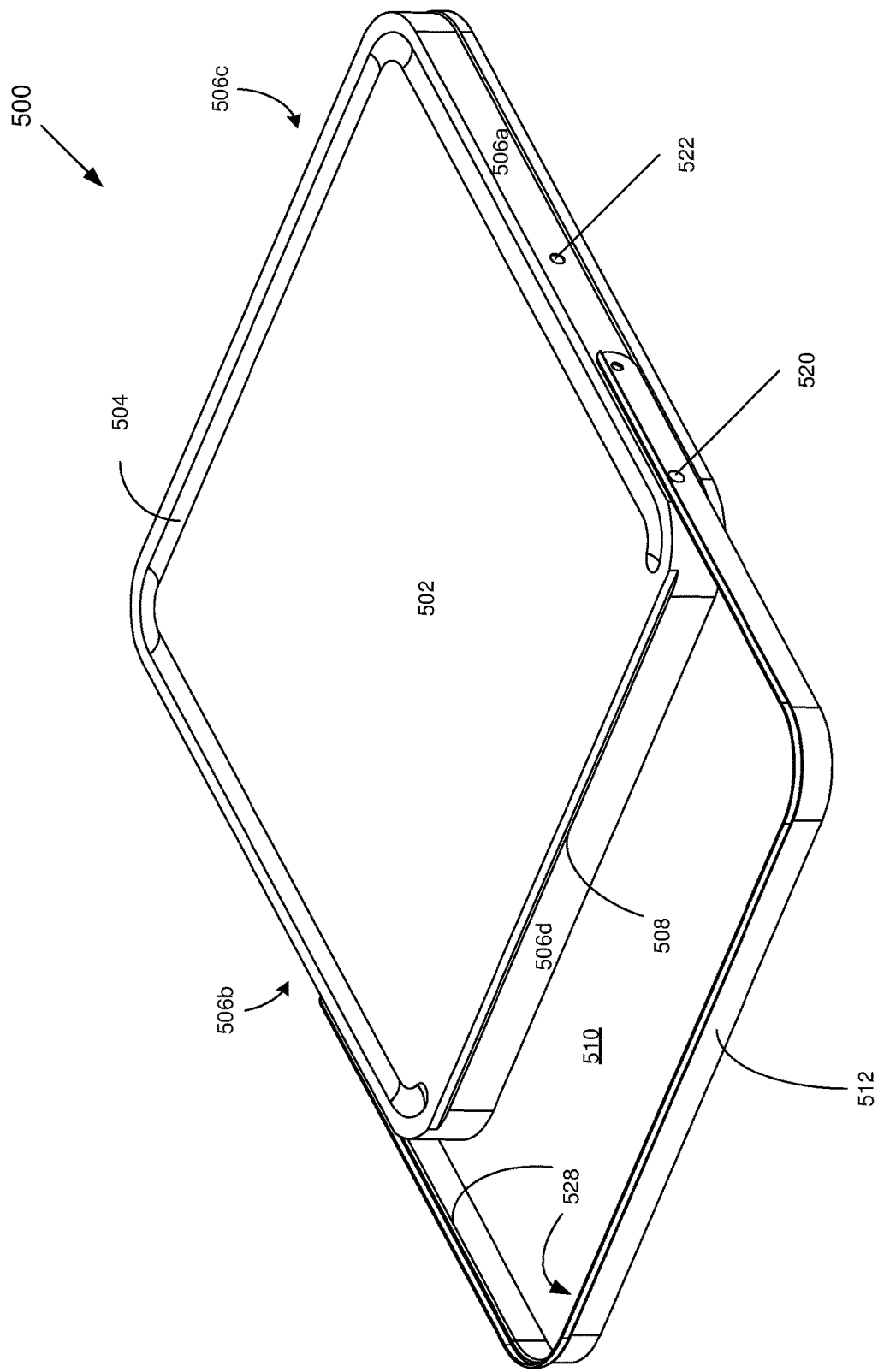
FIG. 5B is another perspective view of the cutting board of FIG. 5A, with the component in a second position, in accordance with some embodiments.

FIG. 5B is another perspective view of the cutting board of FIG. 5A, with the rotatable component in a second position, according to some embodiments.

In the second position, the opposing longitudinal arms and the transverse of bar 512 partially define cut-out 510 for removably receiving one or more stacked or nestable containers, as described previously with regard to other embodiments. In the illustrated embodiments, a container or containers placed in cut-out 510 will be supported by ledge 508 of side 506d of the cutting board and by ledges 528 of bar 512.

Because bar 512 has transitioned from the first position to the second position, which may be described as open, active, deployed, etc., one of recesses 522 of sides 506a, 506b is now visible but recesses 524 are no longer visible because they are covered by and engaged with tabs 520.

Figure 5C:
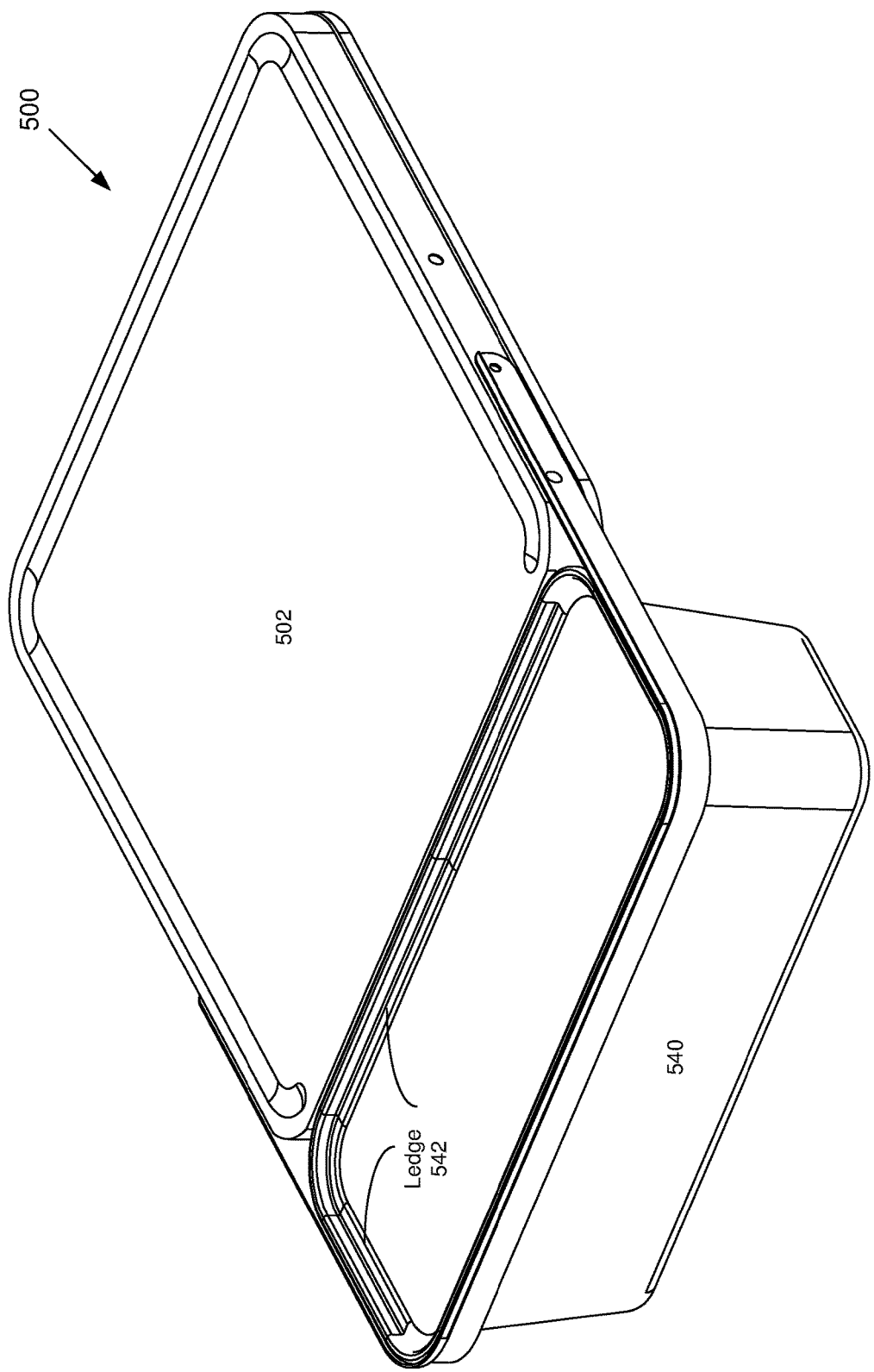
FIG. 5C is another perspective view of the cutting board of FIG. 5A, with a cut-out defined by the component occupied by at least one container, in accordance with some embodiments.

FIG. 5C is another perspective view of the cutting board of FIG. 5A, with the cut-out defined by a rotatable component occupied by at least one container, according to some embodiments.

Container 540 is removably but securely positioned within cut-out 510, and is supported by ledges 508, 528. As shown, the top of container 540 is approximately coplanar with work surface 502, or possibly slightly below. Note that in some embodiments, such as those depicted in FIGS. 5A-D, container 540 may feature only a single internal ledge (e.g., ledge 542 in FIG. 5C), which may support another container nested within container 540, a lid, a horizontally oriented strainer, or some other article.

Figure 5D:
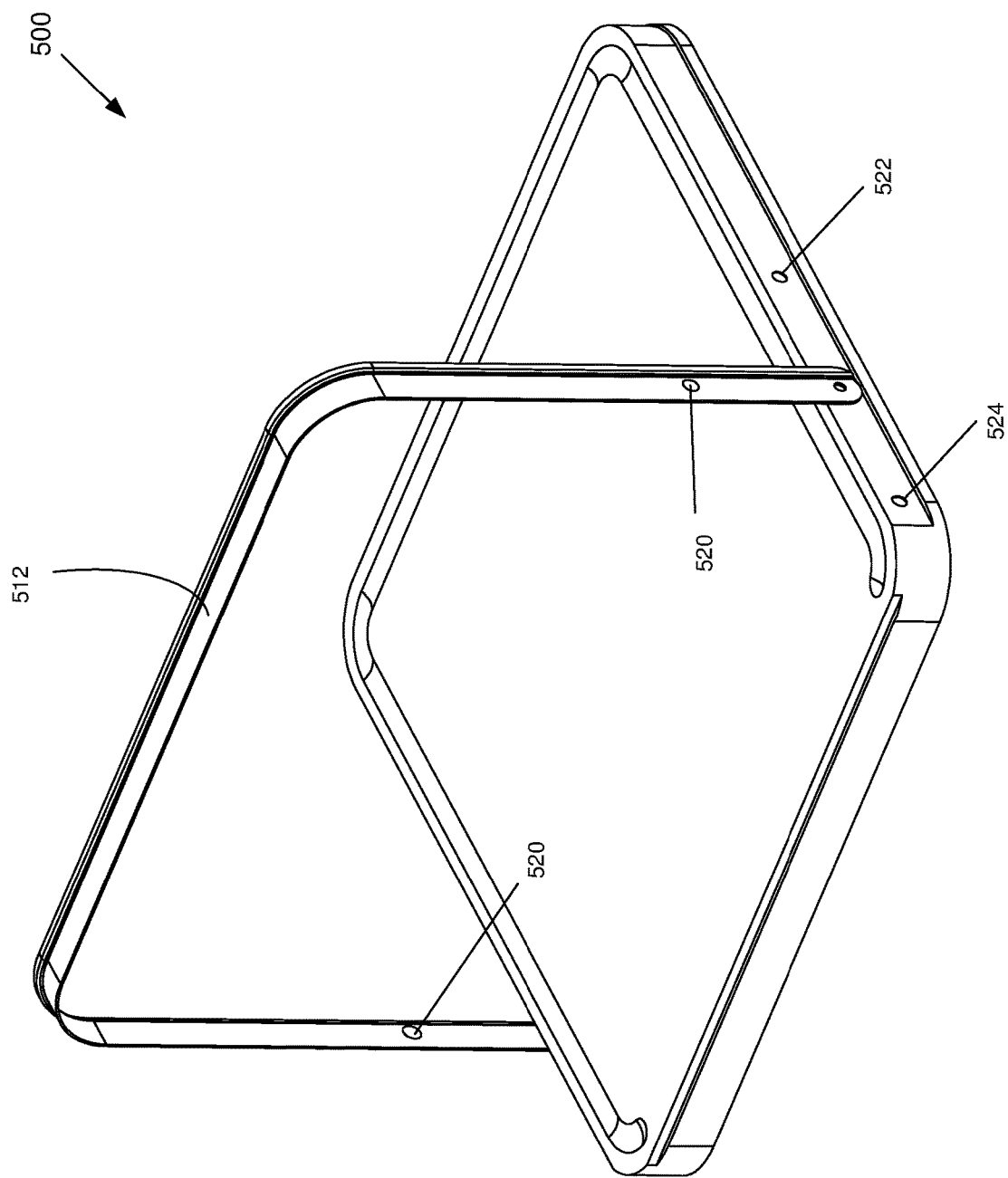
FIG. 5D is a perspective view of the cutting board of FIG. 5A, with the rotatable component in transition between first and second positions, in accordance with some embodiments.

FIG. 5D is another perspective view of the cutting board of FIG. 5A, with rotatable component 512 in the process of transitioning between the first position illustrated in FIG. 5A and the second position illustrated in FIGS. 5B and 5C, according to some embodiments. In this view, both recesses 522 and 524 of side 506a are visible, as well as tabs 520.

In different embodiments, the size (e.g., length, depth) of tabs 520 may differ. In some implementations the tabs may be adjustable, such that when aligned with recesses 522 or 524, the tabs pushed into the recesses and can subsequently be manually extracted (e.g., with one's fingers or fingernails) at least partway when bar 512 is to be rotated. Further, ends of tabs 520 that are inserted in the recesses may be (slightly) rounded to facilitate rotation of bar 512.

Although configured for transition or movement via rotation or pivoting in the embodiments illustrated in FIGS. 5A-D, in other embodiments bar 512 may function differently. For example, a bar or an alternative component may instead slide into and out of slots, pockets, or other cavities shaped and sized to accommodate opposing arms of the bar, or along rails, tracks, or other guides as shown in FIGS. 6A-6D.

Figure 6A:
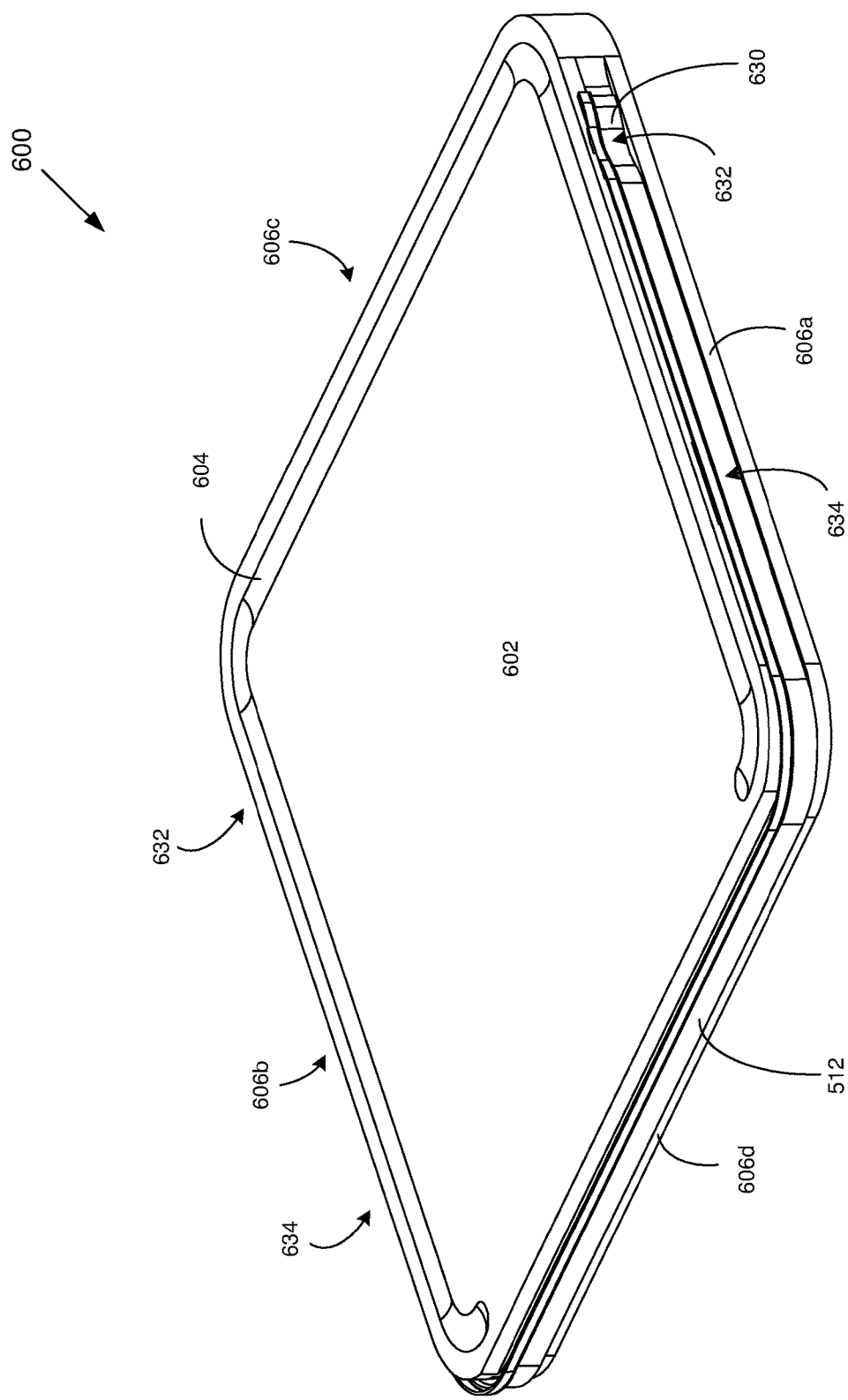
FIG. 6A is a perspective view of a cutting board featuring a slidable component for on-demand creation and removal of a cut-out, with the component in a first position, in accordance with some embodiments.

FIG. 6A is a perspective view of a cutting board featuring on-demand creation and removal of a cut-out, with a slidable component in a first position, according to some embodiments.

In these embodiments, cutting board 600 features work surface 602 and gutter or channel 604 as in some other embodiments, as well as opposing sides 606a, 606b and opposing sides 606c, 606d (sides 606b, 606c are not visible in the view of FIG. 6A). Cutting board 600 also features bar 612 in a first position in which it abuts or lies parallel to sides 606a, 606b, 606d of the cutting board. Specifically, opposing longitudinal arms of bar 612 lay parallel to sides 606a, 606b of cutting board 600, and a transverse portion of the bar lies parallel to side 606d. The position of bar 612 in FIG. 6A may be described as closed, stowed, retracted, etc.

Bar 612 is attached (removably or permanently) to the cutting board via tabs 630, which mate with corresponding recesses 632, 634 of cutting board 600 as bar 612 slides between different positions. More specifically, tabs 630 mate with a first set of recesses 632 when bar 612 is in the first position shown in FIG. 6A, and with recesses 634 when bar 612 is in a second position. In FIG. 6A, one tab 630 is visible, and bar 612 partially obscures recesses 632, 634, which are visible in other figures. Tabs 630 may alternatively be termed fingers, crimps, tips, etc., and recesses 632, 634 may alternatively be termed slots, indentations, niches, etc.

Figure 6B:
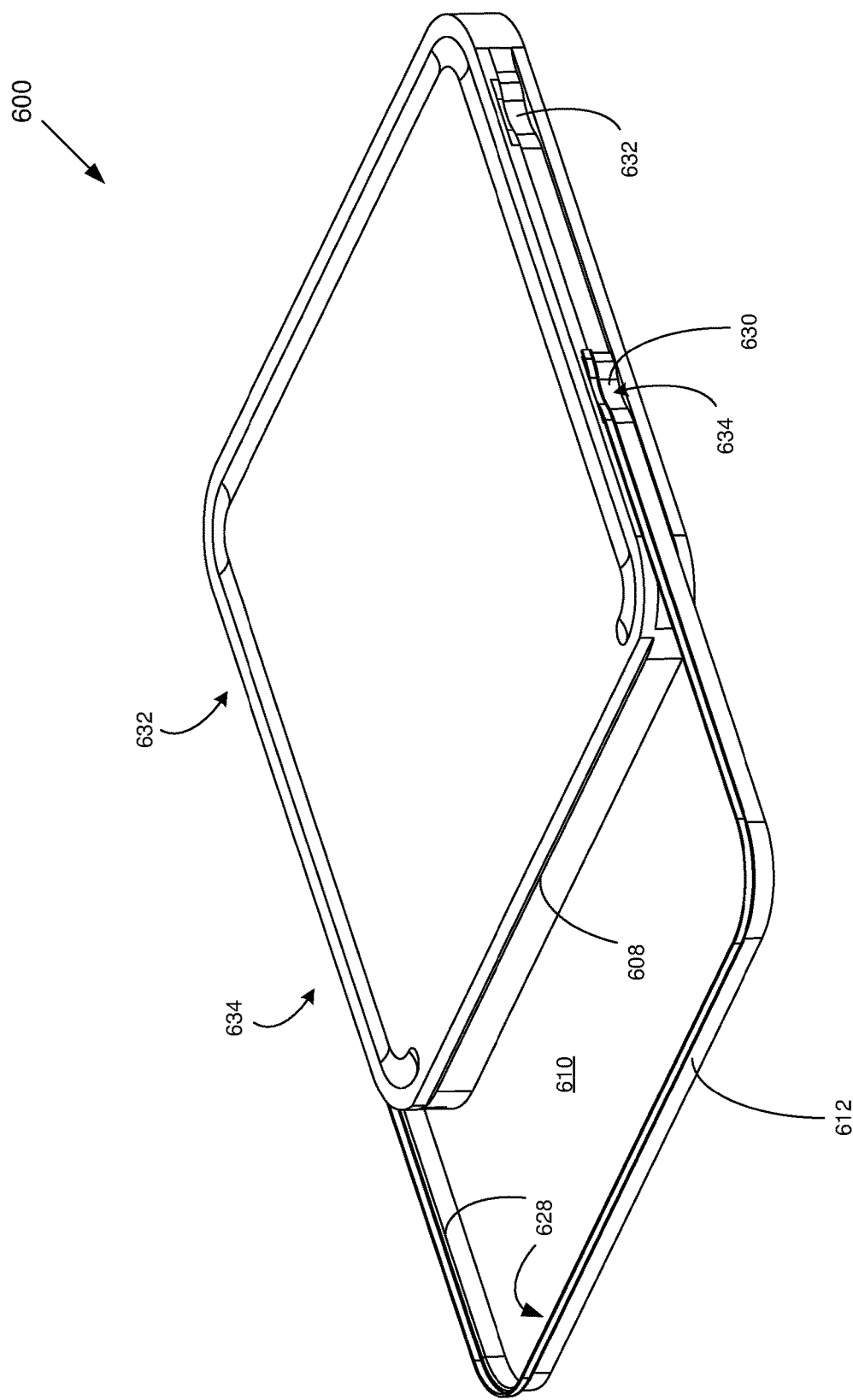
FIG. 6B is another perspective view of the cutting board of FIG. 6A, with the component in a second position, in accordance with some embodiments.

FIG. 6B is another perspective view of the cutting board of FIG. 6A, with the slidable component in a second position, according to some embodiments.

In the second position, the opposing longitudinal arms and the transverse of bar 612 partially define cut-out 610 for removably receiving one or more stacked or nestable containers, as described previously with regard to other embodiments. In the illustrated embodiments, a container or containers placed in cut-out 610 will be supported by ledge 608 of side 606d of the cutting board and by ledges 628 of bar 612.

Because bar 612 has transitioned from the first position to the second position, which may be described as open, active, deployed, etc., one of recesses 632 of sides 606a, 606b is now visible but recesses 634 remain partially obscured by tabs 630.

Figure 6C:
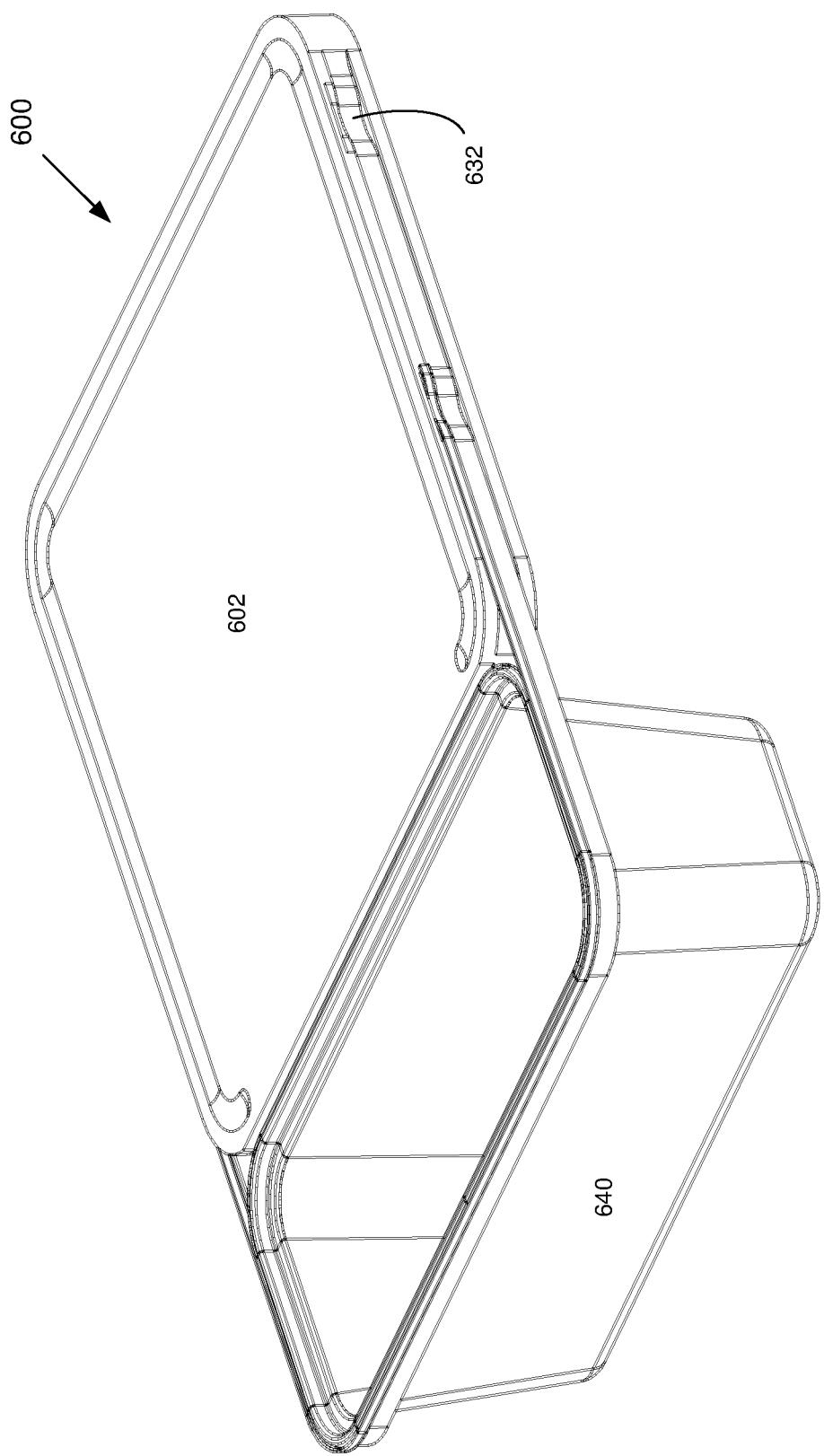
FIG. 6C is another perspective view of the cutting board of FIG. 6A, with a cut-out defined by the component occupied by at least one container, in accordance with some embodiments.

FIG. 6C is another perspective view of the cutting board of FIG. 6A, with the cut-out defined by a slidable component occupied by at least one container, according to some embodiments.

Container 640 is removably but securely positioned within cut-out 610, and is supported by ledges 608, 628. As shown, the top of container 640 is approximately coplanar with work surface 602, or possibly slightly below.

Figure 6D:
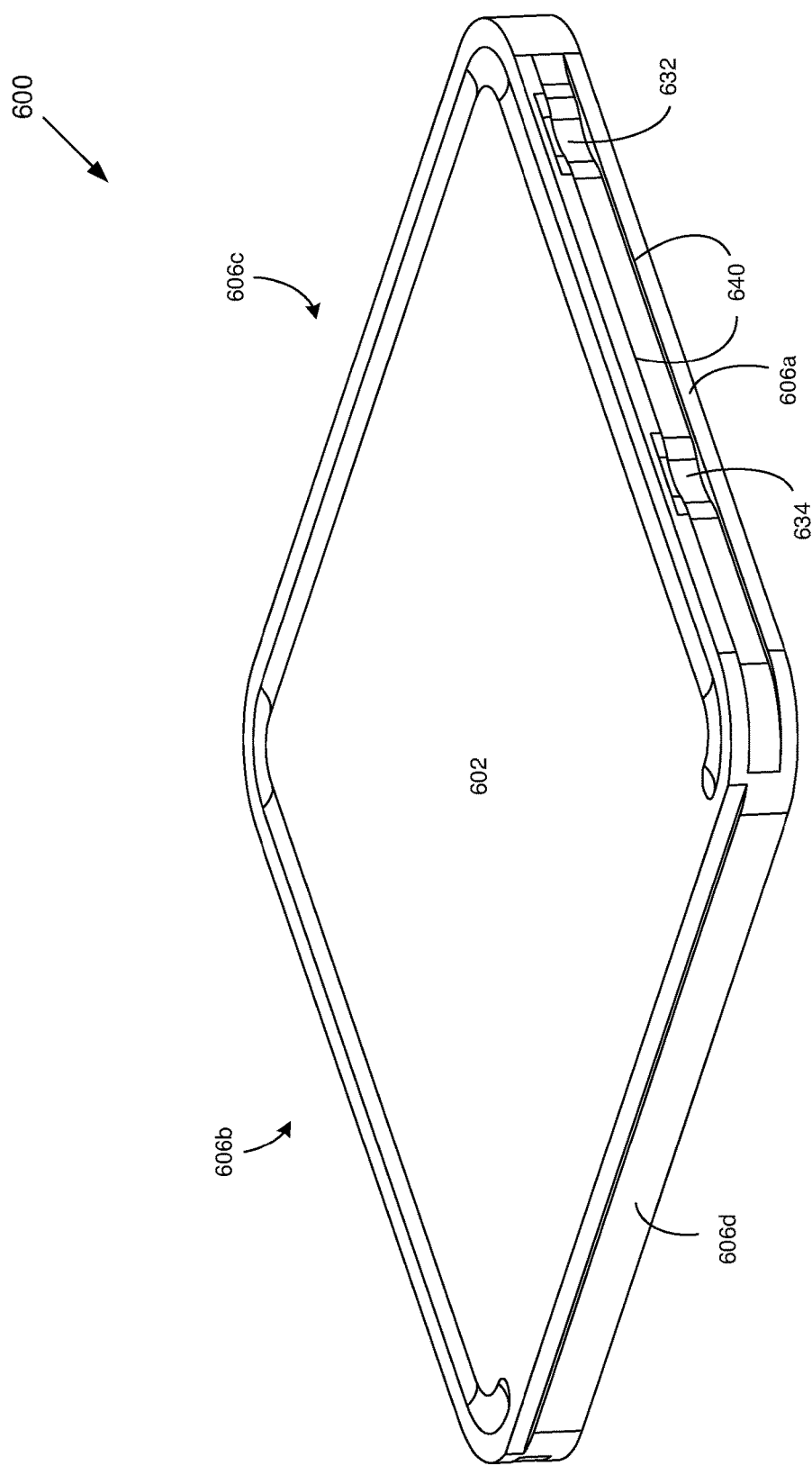
FIG. 6D is a perspective view of the cutting board of FIG. 6A without the slidable component, in accordance with some embodiments.

FIG. 6D is a perspective view of the cutting board of FIG. 6A without the slidable component, according to some embodiments. Because bar 612 is omitted from FIG. 6D, one each of recesses 632, 634 is visible on side 606a of cutting board 600. In this view, a channel or groove for facilitating movement of bar 612 is visible and is formed on each of sides 606a, 606b by upper and lower ledges 640 and by recessed portions of the sides. Thus, as bar 612 transitions between its first position and second position, tabs 630 (and ledges 628 of the longitudinal arms of the bar) slidably engage ledges 640 until mating with recesses 632 or 634.

In some embodiments, tabs 630 are magnetic and recesses 632, 634 include one or more ferrous metals, or vice versa. Thus, in these embodiments, magnetic forces help maintain a slidable bar 612 in a specified position (e.g., the first position or the second position).

In some other embodiments, portions of the longitudinal arms of bar 612 distal to cut-out 610 need not feature or form part of ledges 628 for receiving a container. In these embodiments, these portions of the longitudinal arms may feature upper and/or lower rails, flanges, or protrusions for engaging corresponding tracks or guides of sides 606a, 606b of cutting board, thereby facilitating slidable movement of bar 612 and helping prevent undesired separation of the bar from the cutting board. The tracks or guides in these embodiments may be part of ledges 640.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A cutting board, comprising:
a work surface;
opposing sides, each opposing side including a fixed outward protrusion; and
a frame that is transitional between a first position and a second position, wherein the frame partially defines a cut-out when in the second position but not in the first position;
wherein the frame comprises two opposing arms connected by a transverse, each opposing arm including an orifice; and
wherein the outward protrusions of the opposing sides engage the orifices of the opposing arms to enable the frame to transition between the first position and the second position in a pivoting motion.

2. The cutting board of claim 1, wherein:
each of the opposing sides of the cutting board further includes at least a first recess and a second recess;
each of the opposing arms of the frame includes a tab;
the tabs of the opposing arms engage the first recesses of the opposing sides of the cutting board when the frame is in the first position and not when the frame is in the second position; and
the tabs of the opposing arms engage the second recesses of the opposing sides of the cutting board when the frame is in the second position and not when the frame is in the first position.

3. The cutting board of claim 1, wherein:
the transverse lies parallel to a third side of the cutting board when the frame is in the first position; and
the transverse lies parallel to a fourth side of the cutting board, opposite the third side, when the frame is in the second position.

4. The cutting board of claim 1, wherein the frame comprises one or more ledges for supporting one or more containers removably installed within the cut-out when the frame is in the second position.

5. The cutting board of claim 4, wherein a side of the cutting board adjacent to the cut-out includes an additional ledge for supporting the one or more containers.

6. The cutting board of claim 1, further comprising:
one or more containers removably installed within the cut-out when the frame is in the second position.

7. The cutting board of claim 6, wherein:
no container installed in the cut-out is higher than the work surface.

8. The cutting board of claim 1, further comprising:
a gutter bordering the work surface except for a portion of the work surface adjacent to an edge of the work surface that abuts the cut-out when the frame is in the second position.

9. The cutting board of claim 1, wherein:
the cutting board is positioned such that the work surface has underlying support but the one or more cut-outs overlie open space; and
a portion of the cutting board comprising the work surface is weighted to offset weight of the one or more containers and contents of the one or more containers.

10. A cutting board, comprising:
a work surface;
opposing sides, each opposing side including at least a first recess and a second recess; and
a frame that is transitional between a first position and a second position via a sliding motion, wherein the frame partially defines a cut-out when in the second position but not in the first position;
wherein the frame comprises two opposing arms connected by a transverse, each opposing arm including at least one tab; and
wherein the tabs of the opposing arms engage the first recesses of the opposing sides when the frame is in the first position and engage the second recesses of the opposing sides when the frame is in the second position.

11. The cutting board of claim 10, wherein the frame comprises one or more ledges for supporting one or more containers removably installed within the cut-out when the frame is in the second position.

12. The cutting board of claim 11, wherein a side of the cutting board adjacent to the cut-out includes an additional ledge for supporting the one or more containers.

13. The cutting board of claim 10, further comprising:
one or more containers removably installed within the cut-out when the frame is in the second position.

14. The cutting board of claim 13, wherein:
no container installed in the cut-out is higher than the work surface.

15. The cutting board of claim 10, further comprising:
a gutter bordering the work surface except for a portion of the work surface adjacent to an edge of the work surface that abuts the cut-out when the frame is in the second position.

16. The cutting board of claim 10, wherein:
the cutting board is positioned such that the work surface has underlying support but the one or more cut-outs overlie open space; and
a portion of the cutting board comprising the work surface is weighted to offset weight of the one or more containers and contents of the one or more containers.

* * * * *